United States Patent [19]

Matsumoto et al.

[11] Patent Number: 4,972,917
[45] Date of Patent: Nov. 27, 1990

[54] CARRIAGE CONVEYING EQUIPMENT

[75] Inventors: Yoshihiro Matsumoto, Kadoma; Yasutaka Nakajima, Katano; Haruo Tanioku, Osaka; Kouichi Fujikawa, Hirakata; Norihide Higaki, Ibaraki; Nobuo Mino, Osaka, all of Japan

[73] Assignee: Matsushita Electric Industrial Co., Ltd., Osaka, Japan

[21] Appl. No.: 334,887

[22] Filed: Mar. 30, 1989

[51] Int. Cl.⁵ ............................................. B62D 11/04
[52] U.S. Cl. ..................... 180/168; 180/198; 180/79.1; 280/479.1; 414/556; 414/549; 414/535; 193/35 C
[58] Field of Search ................. 180/15, 196, 209, 168, 180/198, 210, 201, 212, 53.3, 199; 414/556, 551, 549, 546, 541, 535, 532, 529; 254/6 R, 6 C, 2 C; 193/35 A, 35 C; 280/435.1, 479.1, 477

[56] References Cited

U.S. PATENT DOCUMENTS

| | | | |
|---|---|---|---|
| 2,321,874 | 6/1943 | Tandler et al. | 180/79.1 X |
| 3,048,422 | 8/1962 | Payne et al. | 280/789 X |
| 3,078,942 | 2/1963 | Wiebe | 180/79.1 X |
| 3,244,250 | 4/1966 | Barrett | 180/79.1 X |
| 3,563,327 | 11/1968 | Mier | 180/79.1 X |
| 3,698,730 | 10/1972 | Hansen | 280/411.1 X |
| 3,744,586 | 7/1973 | Leinauer | 180/79.1 |
| 3,810,663 | 5/1974 | Berends | 280/425.1 |
| 3,881,568 | 5/1975 | Ando et al. | 180/77.1 X |
| 4,664,213 | 5/1987 | Lin | 180/212 |
| 4,852,901 | 8/1989 | Hanson | 280/477 |

*Primary Examiner*—Charles A. Marmor
*Assistant Examiner*—Alan M. Kagen
*Attorney, Agent, or Firm*—Wenderoth, Lind & Ponack

[57] ABSTRACT

A carriage conveying apparatus has a loaded carriage to be conveyed, and a driving vehicle for coupling, towing and conveying the carriage from below the carriage. Since the vertical load of the carriage is transmitted to the driving vehicle, controlled to a proper magnitude, the driving vehicle may be reduced in size and weight, and it is also possible to have stable travel if the carriage is empty. By designing all three wheels so as to be driven and steered, sideways and spin-turn motions are realized. By providing recognition marks and detecting means, it is possible to position the driving vehicle accurately if the setting position of the carriage deviates.

15 Claims, 5 Drawing Sheets

CARRIAGE CONVEYING EQUIPMENT

FIELD OF THE INVENTION

The present invention relates to carriage conveying apparatus for towing and conveying a load on a carriage from below the carriage.

BACKGROUND OF THE INVENTION

It has been hitherto known as a method of automatically conveying various loads along a specified route to mount the load on a carriage and tow this carriage along a specified route by an unattended driving vehicle.

For such a conveying carriage, a carriage free to move on the floor is used, and a route is determined by a lead wire buried in the floor, or a display line such as metallic tape glued on the floor. These are detected by a magnetic or optical detecting means built into the driving vehicle. The vehicle is designed to convey along a specified route by steering the wheels of the driving vehicle, which is known as a carriage conveying apparatus having flexibility.

Also known is a carriage conveying apparatus enhanced in space usage efficiency by designing it to tow with the driving vehicle positioned under the carriage to be conveyed.

In such a method of towing the carriage with a driving vehicle, however, since the tractive force is obtained by frictional force between the driving wheels of the driving vehicle and the floor, the driving wheels may slip if the weight of the driving vehicle is light, making it impossible to travel, and therefore the live load on the carriage is limited, and accordingly, the weight of the driving vehicle itself must be increased.

When a carriage to be conveyed is coupled behind the driving vehicle, a wide space is needed for a coupling and decoupling station of the driving vehicle and the conveyed carriage, or for their stopping area and for the curved portion of the conveying route.

On the other hand, in the conventional driving vehicle getting under the conveyed carriage, as the driving vehicle can move only back and forth in the running direction, it is impossible to couple the two unless the conveyed carriage is correctly placed on the route of the driving vehicle.

In either method, furthermore, it is impossible to slide, spin or turn the carriage to be conveyed, and handling of the carriage is difficult at the station or load handling point.

SUMMARY OF THE INVENTION

It is hence a primary object of this invention to provide a carriage conveying apparatus capable of conveying a carriage having a large live load in spite of small size and light weight.

It is another object of the invention to provide a carriage conveying apparatus which is high in space usage efficiency by placing a driving vehicle under the carriage to be conveyed, capable of coupling with the driving vehicle securely even if the position of the carriage is not accurate, with easy handling of the carriage at a station or load handling point.

The above objects of the invention are achieved by furnishing the driving vehicle with a proper car body height capable of getting into the space between the bottom of the carriage to be conveyed and the floor and with coupling means projecting from the upper surface of the car body for engaging a coupling part at the bottom of the carriage in the horizontal direction and receiving a vertical reaction.

The driving vehicle preferably has three driving wheels, including a front wheel positioned at a apex of an isosceles triangle and a pair of rear wheels located at both ends of the bottom of the triangle, and steering means for the front wheel the two rear wheels. The steering means comprises a first steering means for steering the front wheel and a second steering means for steering the pair of rear wheels in opposite directions by mutually interlocking the rear wheels. The coupling means comprises an engaging member which is held elevatably, an elevating member driven vertically by the driving means, and an elastic element intervening between the engaging member and the elevating member.

The carriage conveying apparatus of this invention has a first recognition mark on the bottom of the carriage to be conveyed in its running direction, and first detecting means for detecting this recognition mark provided on the driving vehicle. Preferably, a second recognition mark is disposed at the side of the carriage, and second detecting means for detecting this second recognition mark is provided on the driving vehicle. Moreover, the first detecting means is composed of a pair of detecting means disposed at a proper interval in the longitudinal direction of the driving vehicle, and the first recognition mark is disposed in correspondence with such a pair of detecting means. Furthermore, on the bottom of the carriage to be conveyed, a third recognition mark along its widthwise direction is disposed, and a third detecting means for detecting this third recognition mark is provided on the driving vehicle.

Furthermore, in the carriage conveying apparatus of this invention, the front wheels of the carriage to be conveyed are free wheels, and the rear wheels are fixed wheels, and a coupling part is disposed in the middle of the front part of the carriage, and the driving vehicle has a single coupling means corresponding to this coupling part.

Alternatively, in the carriage conveying apparatus of the invention, the front wheels of the carriage to be conveyed are fixed wheels, the rear wheels are free wheels, a pair of coupling parts are disposed on the front part of the carriage, a pair of coupling means corresponding to these coupling parts are provided in the driving vehicle, and the front part of the carriage is to be lifted by the pair of coupling means. Meanwhile, when the front and rear wheels of the carriage are free wheels, the positions of the coupling part and coupling means are arbitrary, and the structure for lifting the carriage with the coupling means can be omitted.

According to the carriage conveying apparatus of this invention as described herein, since part of the load of the carriage is transmitted to the driving vehicle through the coupling part and coupling means, if the weight of the driving vehicle is light, a sufficient vertical load necessary for towing the carriage is obtained from the carriage, so that the driving vehicle may be reduced in size and weight.

By designing all three wheels so as to be driven and steered, it is possible to move the driving vehicle in a direction orthogonal to the running direction, as well as to move the driving vehicle in the running direction so that it can be placed under the carriage in any direction, which makes the handling easier. What is more, by installing the first steering means for steering the front wheel and the second steering means for steering the pair of rear wheels in mutually opposite directions, spin-turning with the front wheel directed in the orthogonal direction to the running direction and the rear wheels in a V-form is possible, in addition to moving in the running direction, steering only the front wheel, and the sideways motion, directing the front wheel and rear wheels at a right angle to the running direction, so that handling in a limited space may be very easy.

By composing the coupling means of an engaging member, an elastic element and an elevating member, it is possible to adjust the push-up force applied from the coupling means side to the carriage depending on the elevated position of the elevating member. Therefore the vertical load applied from the carriage can be controlled to a necessary magnitude, and it is also possible to prevent unexpected lifting of the carriage when empty.

In the carriage conveying apparatus of the invention, by providing the first recognition mark in the running direction and the first detecting means for detecting it, the driving vehicle can be correctly positioned if the setting position of the carriages deviate in the sideways direction. By providing the second recognition mark at the side of the carriage and its respective detecting means, the driving vehicle can be placed under the carriage without interfering with the bottom of the carriage by the sideways motion if the setting position of the carriage is deviated in the running direction. Moreover, by composing the first detecting means of a pair of spaced sensors, it is also possible to correct the inclination of the central axial line in the running direction of the carriage and the driving vehicle. In addition, by providing the third recognition mark in the widthwise direction and its detecting means, positioning in the running direction is possible.

In a different embodiment of the carriage conveying apparatus of the invention, the front wheels of the carriage to be conveyed are free wheels and the rear wheels are fixed wheels, and by the combination of the carriage having a coupling part in the middle of the front part and the driving vehicle having coupling means corresponding to this coupling part, it is possible to convey forward and backward along the conveying route.

Alternatively, by the combination of the carriage having front wheels and rear free wheels and a pair of coupling parts in the front part, with the driving vehicle possessing coupling means corresponding to these coupling parts, being designed to lift the front part of the carriage with the coupling means, sideways movement and spin-turning are also possible, and if the front and rear wheels of the carriage are both free wheels, sideways movement and spin-turning are possible even if the lifting mechanism of the carriage is omitted.

BRIEF DESCRIPTION OF THE DRAWINGS

FIG. 1 to FIG. 6 show a first embodiment of the invention, in which:

FIG. 1 is a plan view showing the outline of an apparatus according to the invention;

FIG. 2 is a side view of the apparatus of FIG. 1;

FIG. 3 is a partially magnified side view of the apparatus of FIG. 1;

FIG. 4 is a longitudinal sectional view of a coupling;

FIG. 5 is a side view of the coupling; and

FIG. 6 is a drawing illustrating the arrangement and action of the position detecting means.

FIG. 7 to FIG. 9 refer to a second embodiment of the invention, in which:

FIG. 7 is a bottom view of the apparatus according to the second embodiment of the invention;

FIG. 8 is a front view of the apparatus of FIG. 7; and

FIG. 9 is a side view of the apparatus of FIG. 7.

DETAILED DESCRIPTION OF THE PREFERRED EMBODIMENTS

Referring now to FIG. 1 to FIG. 6, a first embodiment of the invention is described in detail below.

Figure 1:
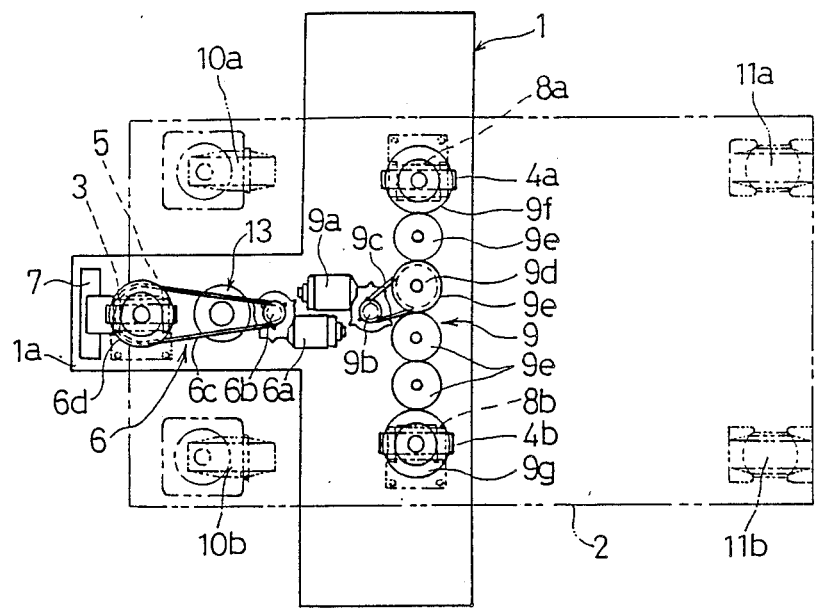
Figure 2:
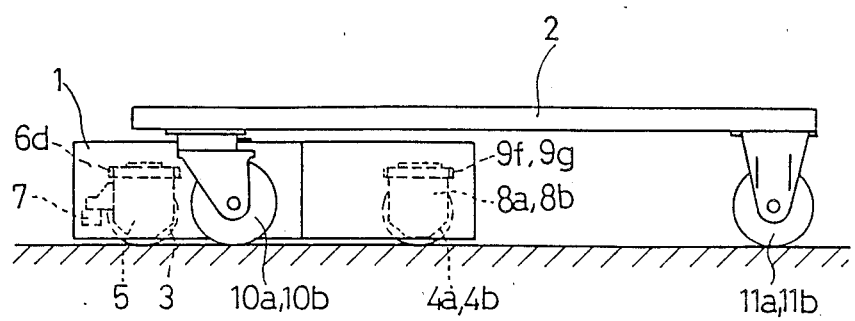
Figure 3:
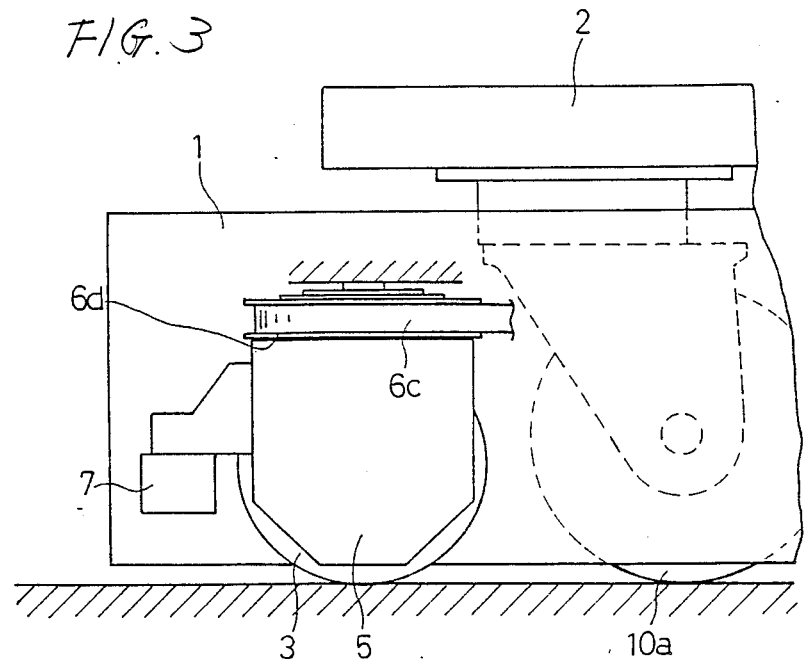

In FIGS. 1 to 3, numeral 1 is a driving vehicle and 2 is a carriage to be loaded with cargo. The driving vehicle has a convex plane shape, and its body height is set slightly lower than the bottom height of the carriage 2 so as to be able to slip under the carriage 2.

The driving vehicle 1 comprises a front wheel 3 incorporating a driving motor (not shown) at the front end of the running direction of the vehicle 1, and a pair of identical rear wheels 4a and 4b also incorporating driving motors. The front wheel 3 is placed at the apex of an isosceles triangle, while the rear wheels 4a and 4b are located at both ends of the bottom side of the triangle.

The front wheel 3 is mounted on a front wheel bracket 5, which is supported rotatably around its center on a vertical axis, and is rotated and operated by a first steering means 6 composed of a first steering motor 6a, a driving pulley 6b affixed to an output shaft of the motor 6a and a timing belt 6c. A steering pulley 6d is affixed to the front wheel bracket 5. At the front part of the front wheel bracket 5, there is a sensor 7 for steering, such as a line sensor, for detecting a line indication marker, such as metal tape adhered along the conveying route on the floor and position indication markers formed at specified intervals.

The rear wheels 4a and 4b are similarly supported by rear wheel brackets 8a and 8b rotatably supported around their center on a vertical axis, and are rotated in mutual cooperation and in opposite directions by a second steering means 9 composed of a second steering motor 9a, a driving pulley 9b fixed to an output shaft of the motor 9a, a timing belt 9c, a driven pulley 9d and a gear train 9e, and steering gears 9f, and 9g fixed on the rear wheel brackets 8a and 8b.

On the carriage 2 to be conveyed, front wheels 10a and 10b are composed of a pair free wheels, and rear wheels 11a and 11b are composed of a pair of fixed wheels, and are mounted to the carriage. A forward projection part 1a of the driving vehicle 1 is designed to get in between the front wheels 10a and 10b.

Figure 4:
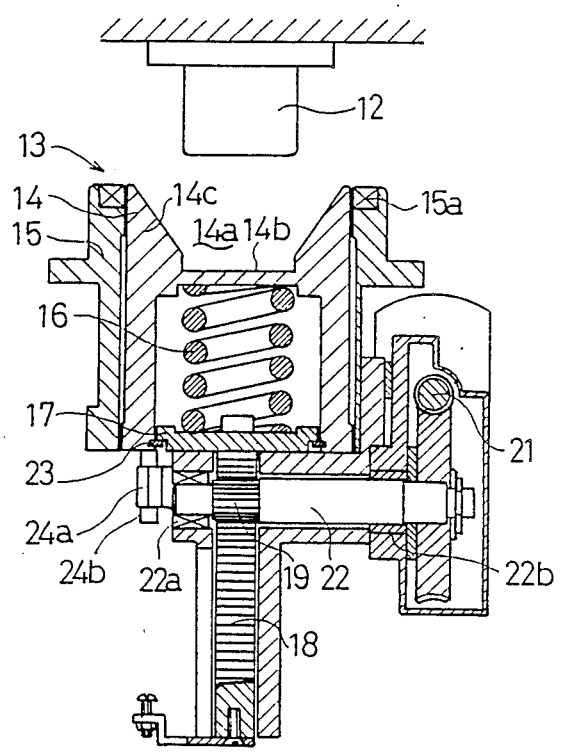
Figure 5:
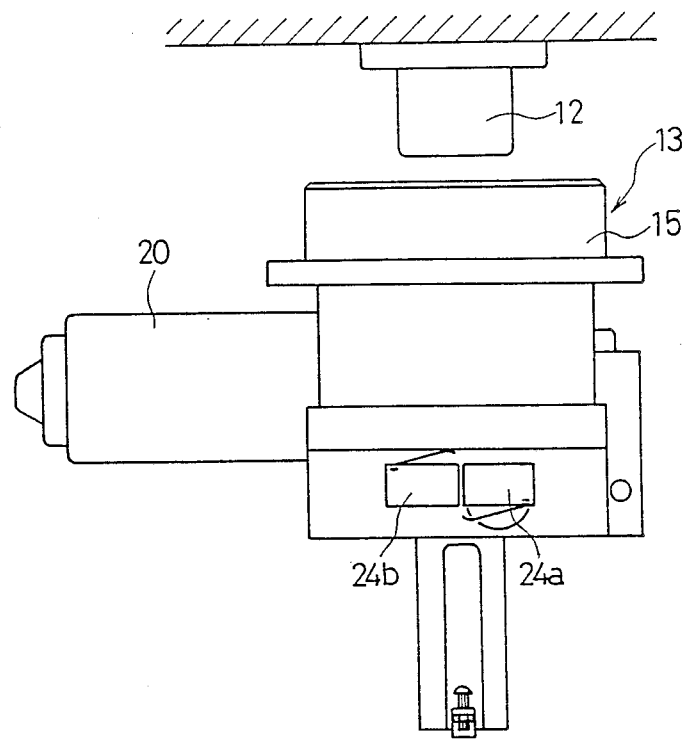

At the rear position of the front wheel 3 of the driving vehicle 1, as shown in FIGS. 4 and 5, there is a coupling means 13, which is engaged with a coupling part 12 disposed on the carriage 2 for receiving a vertical reaction.

In FIGS. 4 and 5, numeral 14 is an engaging member having an engaging recess 14a formed at the upper end thereof in which the protrusion of the coupling part 12 is inserted. The bottom of the engaging recess 14a is formed as a receiving plane 14b for receiving a vertical reaction, and a guide taper 14c is formed to taper outwardly upward. This engaging member 14 is elevatably supported by a guide tube body 15, and 15a is an oil seal. The engaging member 14 is supported from below by an elevating member 17 through a compression spring 16, and this elevating member 17 is fixed with a rack 18 which is driven vertically by a pinion 19. The pinion 19 is affixed to a shaft 22 which is rotated and driven by a driving motor 20 through a worm gear mechanism 21. Numerals 22a and 22b are bearings of the shaft 22, 23 is a stopper for defining the lower limit of the elevating member 17 with respect to the engaging member 14 in order to present an initial compression force of the compression spring 16, and 24a and 24b are limit switches for detecting the upper limit of the elevating member 17 and the lower limit of the engaging member 14.

Figure 6:
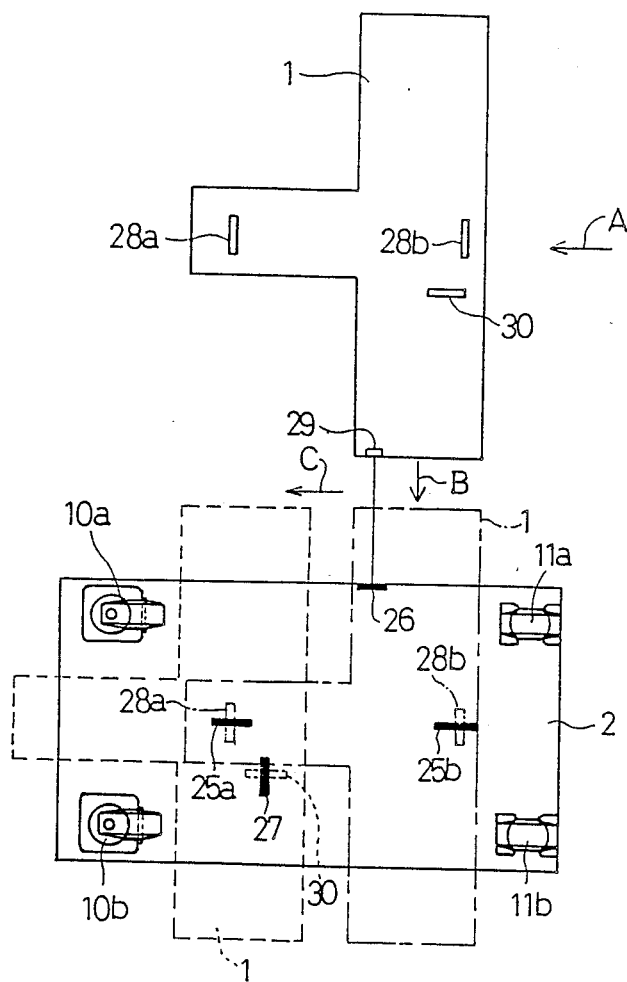

In order to position the driving vehicle 1 at a specified position of the carriage 2 and engage the coupling means 13 securely with the coupling part 12 a means for detecting the relative position of the driving vehicle 1 and the carriage 2 is provided as shown in FIG. 6. Numerals 25a and 25b are a pair of first recognition marks formed at a proper interval on the central axial line in the running direction on the bottom of the carriage 2, 26 is a second recognition mark formed at the side of the carriage 2, and 27 is a third recognition mark formed in the widthwise direction at a proper position on the bottom of the carriage 2. On the other hand, on the driving vehicle 1 there are first detecting means 28a and 28b for detecting the first recognition marks 25a and 25b for positioning the driving vehicle 1 in the sideways direction, a second detecting means 29 for detecting the second recognition mark 26 before the driving vehicle 1 slips under the carriage 2 in order to detect the position in the running direction, and a third detecting means 30 for detecting the second recognition mark 27 after the driving vehicle 1 has slipped in under the carriage 2 in order to position the driving vehicle 1 in the running direction.

The operation of the thus composed apparatus is described below. In FIG. 6, when conveying the carriage 2 placed approximately at the specified position by means of the driving vehicle 2, first the driving vehicle 1 moves on the line marked on the side so as not to interfere with the carriage 2 in the running direction as indicated by arrow A, and when the second recognition mark 26 at the side of the carriage 2 is detected by the second detecting means 29, it stops at the position indicated by solid lines. In consequence, by the first and second steering means 6 and 9, the front wheel 3 and rear wheels 4a and 4b are set in the direction perpendicular to the running direction to move side ways, as indicated by arrow B. The vehicle 1 stops when the first recognition marks 25a and 25b are detected by the first detecting means 28a and 28b. At this time, if only one recognition mark is detected, the wheel 3 or 4a and 4b at a non-detected side is further driven, and when the both recognition marks 25a and 25b are detected, the vehicle stops in the state as indicated by a single-dot chain line. Thus, an inclination of the central axial line of the carriage 2 and driving vehicle 1 is corrected. Next, the front wheel 3 and the rear wheels 4a and 4b are set in the running direction by the first and second steering means 6 and 9, and driven in the direction as indicated by arrow C, and the vehicle 1 is stopped in the state indicated by the broken line when the third recognition mark 27 is detected by the third detecting means 30.

In this state, the coupling part 12 of the carriage 2 and the coupling means 13 oppose each other, and the pinion 19 is then rotated by the worm gear mechanism 21 by driving the driving motor 20, and the elevating member 17 is raised by the rack 18. As a result, the engaging member 14 is lifted through the compression spring 16, and the coupling part 12 engages the recess 14a of the engaging member 14, and the carriage 2 and the driving vehicle 1 are coupled together. At this time, any slight positional deviation is adjusted by the guide taper 14c. When the elevating member 17 goes up further, the engaging part 12 abuts against the receiving plane 14b of the engaging member 14, and thereafter the compression spring 16 is compressed along with the elevation of the elevating member 17. When the elevating member 17 rises up to its upper limit, it is detected by the limit switch 24a, and the driving motor 20 stops. In this state, the carriage 2 is pushed up, resisting the compression reaction of the compression spring 16, and this reaction acts on the engaging member 14 as a vertical reaction. As a result, if the driving vehicle 1 is lightweight, the vertical load necessary for towing the carriage 2 is obtained from the carriage 2 as this vertical reaction.

When the coupling of the driving vehicle 1 and carriage 2 is completed, the front wheel 2 and the rear wheels 4a and 4b are driven, and the line indication markers on the floor are detected by the steering sensor 7. By operating the first steering means 6, depending on the detected signal, to steer the front wheel 3, the carriage 2 may be conveyed along the specified conveying route.

When the carriage 2 has been conveyed to a specified position, the driving motor 20 is driven in a reverse direction to lower the elevating member 17, and engagement of the engaging member 14 with the engaging part 12 is cleared, and thereby the driving vehicle 1 and the carriage 2 are decoupled. By the sideways motion of the driving vehicle 1 after moving backward, they are separated from each other, and the driving vehicle 1 goes on to the next conveying operation.

In this first embodiment, the driving vehicle 1 itself can perform sideways motion and spin-turning motion, as well as forward and backward motion, and by making use of these motions, it is possible to couple with the carriage 2 easily. But when towing by coupling with the carriage 2, the vehicle 1 can be moved only forward and backward, in principle.

Figure 7:
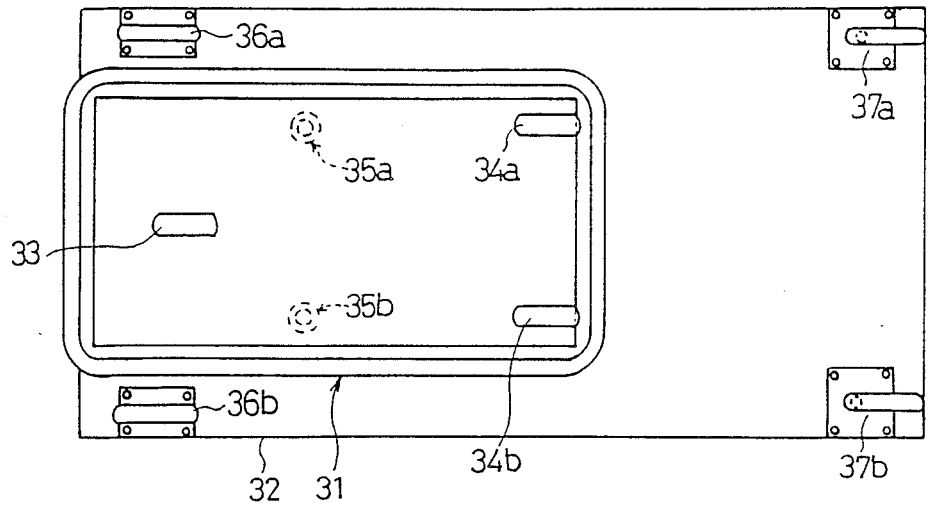
Figure 8:
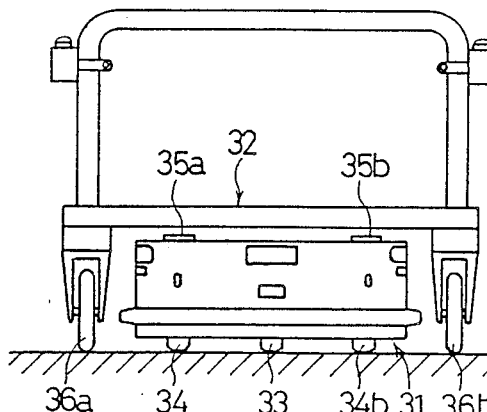
Figure 9:
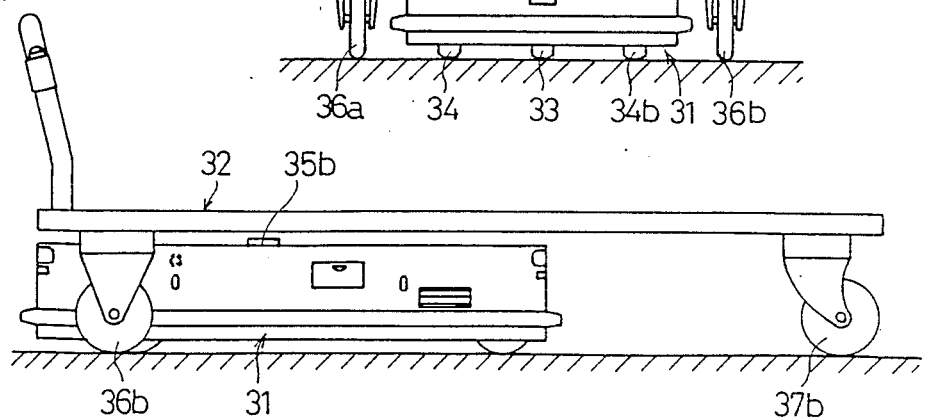

Next, referring now to FIG. 7 to FIG. 9, a second embodiment is explained in which the carriage can be moved in a sideways motion or a spin-turn motion.

A driving vehicle 31 in the second embodiment, similar to the first embodiment, possesses a single front wheel 33 and a pair of rear wheels 34a and 34b, which are steered by individual steering means (not shown). At the rear part of the front wheel 33 of this driving vehicle 31, a pair of coupling means 35a and 35b are disposed at a proper interval in the widthwise direction of the car body, and there are corresponding coupling parts on the carriage 32 to be conveyed. The structure of the coupling means 35a and 35b is the same as the coupling means shown in FIGS. 4 and 5. On the other hand, the carriage 32 is composed of fixed front wheels 36a and 36b and free rear wheels 37a and 37b. The recognition marks and detecting means for detecting the relative position of the driving vehicle 31 and carriage 32 are disposed as in the first embodiment, although no shown in the drawing.

Since the wheels 36a and 36b are composed of fixed wheels, and there is a sufficiently wide space between them, the plane shape of the driving vehicle 31 is rectangular.

In this second embodiment, the driving vehicle 31 and the carriage 32 are positioned as shown in FIGS. 7 to 9 and are mutually coupled with the coupling means 35a and 35b. The front part of the carriage 32 is lifted by the coupling means 35a and 35b, and the front fixed wheels 36a and 36b are cleared from the floor.

In this state, by driving the driving vehicle 31, the carriage 32 can be conveyed along the conveying route. Besides, since they are mutually coupled by the pair of coupling means 35a and 35b, relative rotation of the driving vehicle 31 and the carriage 32 can be prevented, and the rotational moment can be transmitted. Moreover, since the rear wheels 37a and 37b of the carriage 32 contacting the floor are free wheels, when moving the driving vehicle 31 sideways, the carriage 32 can move sideways. By steering the front wheel 33 of the driving vehicle 31 in a perpendicular direction and steering the rear wheels 34a and 34b in a V-form to spin and turn, the carriage 32 can also spin and turn, and it is possible to move sideways or change direction in a limited space, and handling becomes extremely easy.

In a third embodiment, both the front and rear wheels are free wheels, instead of the fixed wheels used in the front wheels 36a and 36b of the carriage 32 in the second embodiment.

In this case, the same action and effect will be obtained without lifting the front part of the carriage 32 with the coupling means 35a and 35b.

In the second and third embodiments, meanwhile one pair of coupling means 35a and 35b are provided, but more pairs may be provided as required.

In the foregoing embodiments, the coupling means possessed coupling recesses and the coupling parts had projections, but it is the same if formed reversely, that is, the coupling means possessing projections or engaging shafts, and the coupling parts having recesses.

INDUSTRIAL APPLICABILITY

According to the carriage conveying equipment of this invention, since part of the load of the carriage to be conveyed is transmitted to the driving vehicle for conveying through the engaging part and coupling means, a sufficient vertical load necessary for towing the carriage is obtained from the carriage if the weight of the driving vehicle itself is too light, so that the driving vehicle may be reduced in size and weight.

Moreover, by designing all three wheels so as to be driven and steered, it is possible to move the driving vehicle in the direction orthogonal to the running direction, or to spin and turn, aside from moving it in the running direction, and the operation and handling thereof will be easier. Still more, by installing the first steering means for steering the front wheel and the second steering means for steering the pair of rear wheels in mutually opposite directions, various steering operations can be done easily, such as steering of both front and rear wheels in the orthogonal direction to the running direction and steering of front wheel in the orthogonal direction and the rear wheels in a V-form.

Besides, by composing the coupling means of an coupling, an elastic element and an elevating member, the push-up force applied from the coupling means side to the carriage side can be adjusted depending on the elevated position of the elevating member. The vertical load received from the carriage can be controlled to a necessary magnitude, so that unexpected lifting of the carrier when empty can be prevented.

In the carriage conveying equipment of the invention, by disposing first recognition marks in the running direction and first detecting means for detecting them, the driving vehicle can be correctly set at the corresponding position if the setting position of the carriage is deviated in the sideways direction. By disposing second recognition marks at the side of the carriage, the driving vehicle may be placed under the carriage without interfering with the bottom thereof by moving sideways, even if the setting position of the carriage is deviated in the running direction. Moreover, by composing the first detecting means of a pair of sensors disposed at an interval, the inclination of the central axial line in the running direction of the carriage and driving vehicle can be also corrected. What is more, by disposing third recognition marks in the widthwise directions, positioning in the running direction is possible.

In the carriage conveying equipment of this invention, meanwhile, by the combination of the carriage having free front wheels and fixed rear wheels and also possessing a coupling part in the middle of the front part, and the driving vehicle possessing the coupling means corresponding to the coupling part, it is possible to convey forward and backward along the conveying route.

Or by the combination of the carriage having fixed front wheels, free rear wheels and a pair of coupling parts in the front part, and the driving vehicle having coupling means corresponding to these coupling parts and designed to lift the front part of the carriage with such coupling means, sideways and spin-turn motions are also possible. Furthermore, when the front and rear wheels of the carriage are both free wheels, sideways motion and spin-turning are possible without requiring the lifting mechanism of the carriage.

We claim:

1. A carriage conveying apparatus, comprising:
   a carriage to be conveyed, said carriage having a carriage body having an upper load supporting surface and an underside, and said carriage body having a plurality of wheels connected thereto for movably supporting said carriage body;
   a driving vehicle for connection with and conveyance of said carriage to be conveyed, said driving vehicle comprising a car body having a height such that the entire said driving vehicle can pass below said underside of said carriage body;
   a coupling part connected to said underside of said carriage body for connection with said driving vehicle;
   a coupling means on said driving vehicle for engaging and coupling with said coupling part on said carriage body such that said driving vehicle receives a substantially vertical reaction force due to the weight of said carriage;
   first recognition marks for being detected by said driving vehicle disposed on said underside of said carriage body, said first recognition marks being elongated in a direction of conveyance of said carriage to be conveyed; and
   first detecting means on said driving vehicle for detecting said first recognition marks when said driving vehicle moves under said carriage body so as to properly position said driving vehicle under said carriage body.

2. The carriage conveying apparatus as set forth in claim 1, wherein:

said driving vehicle further comprises three driving wheels, a front wheel located at a front portion of said driving vehicle and forming the apex of an isosceles triangle and a pair of rear wheels located at a rear portion of said driving vehicle and forming the two base corners of the isosceles triangle, and steering means for steering said front wheel and said pair of rear wheels.

3. The carriage conveying apparatus as set forth in claim 2, wherein:
said steering means comprises a first steering mechanism for steering said front wheel and a second steering mechanism for steering said pair of rear wheels in cooperation with each other but in mutually opposite directions.

4. The carriage conveying means as set forth in claim 1, 2 or 3, wherein:
said coupling means on said driving vehicle comprises an engaging member for elevational movement with respect to said driving vehicle so as to be able to engage said coupling part on said carriage body, an elevating member for elevating said engaging member, driving means for vertically driving said elevating member, and an elastic element operably connecting said engaging member and said elevating member.

5. A carriage conveying apparatus, comprising:
a carriage to be conveyed, said carriage having a carriage body having an upper surface and an underside and means for movably supporting said carriage body spaced from a support surface on which said carriage is to be moved;
a driving vehicle for connection with and conveyance of said carriage to be conveyed, said driving vehicle having a height such that said driving vehicle can move in between said underside of said carriage body and the support surface when said carriage is supported by said support surface;
a coupling part connected to said underside of said carriage body for connection with said driving vehicle;
a coupling means on said driving vehicle for engaging and coupling with said coupling part on said carriage body such that said driving vehicle receives a substantially vertical reaction force due to the weight of said carriage;
first recognition marks for being detected by said driving vehicle disposed on said underside of said carriage body, said first recognition marks being elongated in a direction of conveyance of said carriage to be conveyed; and
first detecting means on said driving vehicle for detecting said first recognition marks when said driving vehicle moves under said carriage body so as to properly position said driving vehicle under said carriage body.

6. The carriage conveying apparatus as set forth in claim 5, wherein:
said first detecting means detects said first recognition marks to properly position said driving vehicle when said driving vehicle moves under said carriage body from one side thereof in a direction substantially perpendicular to said direction of conveyance.

7. The carriage conveying apparatus as set forth in claim 5, wherein:
a second recognition mark is disposed on one side of said carriage body; and
a second detecting means is disposed on said driving vehicle for detecting said second recognition mark.

8. The carriage conveying apparatus as set forth in claim 7, wherein:
said second detecting means detects said second recognition mark to properly position said driving vehicle adjacent said carriage in said direction of said conveyance before said driving vehicle moves under said carriage body.

9. The carriage conveying apparatus as set forth in claim 5 or 7, wherein:
said first detecting means comprises a pair of detectors disposed at a predetermined interval in the longitudinal direction of said driving vehicle, and said first recognition marks are disposed so as to correspond with said detectors, respectively.

10. A carriage conveying apparatus, comprising:
a carriage to be conveyed, said carriage having a carriage body having an upper surface and an underside and means for movably supporting said carriage body spaced from a support surface on which said carriage is to be moved;
a driving vehicle for connection with and conveyance of said carriage to be conveyed, said driving vehicle having a height such that said driving vehicle can move in between said underside of said carriage body and the support surface when said carriage is supported by said support surface;
a coupling part connected to said underside of said carriage body for connection with said driving vehicle;
a coupling means on said driving vehicle for engaging and coupling with said coupling part on said carriage body such that said driving vehicle receives a substantially vertical reaction force due to the weight of said carriage;
first recognition marks for being detected by said driving vehicle disposed on said underside of said carriage body, said first recognition marks being elongated in a direction of conveyance of said carriage to be conveyed, and
first detecting means on said driving vehicle for detecting said first recognition marks when said driving vehicle moves under said carriage body so as to properly position said driving vehicle under said carriage body;
a second recognition mark is disposed on one side of said carriage body;
a second detecting means is disposed on said driving vehicle for detecting said second recognition mark;
a third recognition mark on said underside of said carriage extending substantially in a direction perpendicular to said direction of conveyance; and
third detecting means on said driving vehicle for detecting said third recognition mark.

11. The carriage conveying apparatus as set forth in claim 10, wherein:
said third detecting means detects said third recognition mark when said driving vehicle is under said carriage to properly position said driving vehicle in said direction of conveyance and substantially align said coupling means with said coupling part.

12. The carriage conveying apparatus, comprising:
a carriage to be conveyed, said carriage having a carriage body having an upper surface and an underside and means for movably supporting said carriage body spaced from a support surface on which said carriage is to be moved;

a driving vehicle for connection with and conveyance of said carriage to be conveyed, said driving vehicle having a height such that said driving vehicle can move in between said underside of said carriage body and the support surface when said carriage is supported by said support surface;

a coupling part connected to said underside of said carriage body for connection with said driving vehicle;

a coupling means on said driving vehicle for engaging and coupling with said coupling part on said carriage body such that said driving vehicle receives a substantially vertical reaction force due to the weight of said carriage;

said means for movably supporting said carriage body comprising a pair of front wheels mounted to said carriage body so as to be rotatable about a horizontal axis and freely pivotable about a vertical axis and a pair of rear wheels mounted to said carriage body so as to be rotatable about a horizontal axis and fixed with respect to pivotal movement about a vertical axis;

wherein said coupling part on said carriage body is disposed substantially at the middle of said underside of said carriage body at the end of said carriage body whereat said front wheels are mounted;

first recognition marks for being detected by said driving vehicle disposed on said underside of said carriage body, said first recognition marks being elongated in a direction of conveyance of said carriage to be conveyed; and first detecting means on said driving vehicle for detecting said first recognition marks when said driving vehicle moves under said carriage body so as to properly position said driving vehicle under said carriage body.

13. A carriage conveying apparatus, comprising:
a carriage to be conveyed, said carriage having a carriage body having an upper surface and an underside and means for movably supporting said carriage body spaced from a support surface on which said carriage is to be moved;
a driving vehicle for connection with and conveyance of said carriage to be conveyed, said driving vehicle having a height such that said driving vehicle can move in between said underside of said carriage body and the support surface when said carriage is supported by said support surface;
said means for movably supporting said carriage body comprising a pair of front wheels mounted to said carriage body so as to be rotatable about a horizontal axis and fixed with respect to pivotal movement about a vertical axis and a pair of rear wheels mounted to said carriage body so as to be rotatable about a horizontal axis and freely pivotable about a vertical axis;
a pair of coupling parts, connected to said underside of said carriage body at the end of said carriage body whereat said front wheels are mounted, for connection with said driving vehicle;
a pair of separate coupling means on said driving vehicle for engaging and coupling with said coupling parts, respectively, on said carriage body, and for lifting said carriage body at said front wheel end such that said driving vehicle receives a substantially vertical reaction force due to the weight of said carriage and said front wheels are raised substantially off of the support surface;

first recognition marks for being detected by said driving vehicle disposed on said underside of said carriage body, said first recognition marks being elongated in a direction of conveyance of said carriage to be conveyed; and first detecting means on said driving vehicle for detecting said first recognition marks when said driving vehicle moves under said carriage body so as to properly position said driving vehicle under said carriage body.

14. A carriage conveying apparatus, comprising:
a carriage to be conveyed, said carriage having a carriage body having an upper surface and an underside and means for movably supporting said carriage body spaced from a support surface on which said carriage is to be moved;
a driving vehicle for connection with and conveyance of said carriage to be conveyed, said driving vehicle having a height such that said driving vehicle can move in between said underside of said carriage body and the support surface when said carriage is supported by said support surface;
said means for movably supporting said carriage body comprising a pair of front wheels and a pair of rear wheels mounted to said carriage body so as to be rotatable about a horizontal axis and freely pivotable about a vertical axis;
a pair of coupling parts, connected to said underside of said carriage body at the end of said carriage body whereat said front wheels are mounted, for connection with said driving vehicle;
a pair of separate coupling means on said driving vehicle for engaging and coupling with said coupling parts, respectively, on said carriage body such that said driving vehicle receives a substantially vertical reaction force due to the weight of said carriage;
first recognition marks for being detected by said driving vehicle disposed on said underside of said carriage body, said first recognition marks being elongated in a direction of conveyance of said carriage to be conveyed; and
first detecting means on said driving vehicle for detecting said first recognition marks when said driving vehicle moves under said carriage body so as to properly position said driving vehicle under said carriage body.

15. The carriage conveying apparatus, comprising:
a carriage to be conveyed, said carriage having a carriage body having an upper surface and an underside and means for movably supporting said carriage body spaced from a support surface on which said carriage is tobe moved;
a driving vehicle for connection with and conveyance of said carriage to be conveyed, said driving vehicle having a height such that said driving vehicle can move in between said underside of said carraige body and the support surface when said carraige is supported by said support surface;
a coupling part connected to said underside of said carriage body for connection with said driving vehicle;
a coupling means on said driving vehicle for engaging and coupling with said coupling part on said carraige body such that said driving vehicle receivs a substantially vertical reaction force due to the weight of said carriage;

first recognition marks for being detected by said driving vehicle disposed on said underside of said carriage body, said first recognition marks being elongated in a direction of conveyance of said carriage to be conveyed; and first detecting means on said driving vehicle for detecting said first recognition marks when said driving vehicle moves under said carriage body so as to properly position said driving vehicle under said carriage body;

said carriage body comprising a pair of front wheels mounted to said carriage body so as to be rotatable about a horizontal axis and freely pivotable about as vertical axis and a pair of rear wheels mounted to said carriage body so as to be rotatable about a horizontal axis and fixed with respect to pivotal movement about a vertical axis;

wherein said coupling part on said carriage body is disposed substantially at the middle of said underside of said carriage body at the end of said carriage body whereat said front wheels are mounted.

* * * * *